United States Patent [19]

Kawazoe

[11] 4,279,427
[45] Jul. 21, 1981

[54] SKI EDGING DEVICE FOR A SKI SUPPORTED VEHICLE OR THE LIKE

[76] Inventor: Soichi Kawazoe, 452-72, Kajigayacho, Totsuka-ku, Yokohama-shi, Kanagawa-ken, Japan

[21] Appl. No.: 66,773

[22] Filed: Aug. 15, 1979

[30] Foreign Application Priority Data

Apr. 9, 1979 [JP] Japan .................................. 54/42849

[51] Int. Cl.³ ............................................. B62B 13/12
[52] U.S. Cl. ..................................... 280/16; 280/21 A
[58] Field of Search ............. 280/12 R, 12 A, 12 AA, 280/21 R, 21 A, 16, 112 A; 305/11, 12; 114/281

[56] References Cited

U.S. PATENT DOCUMENTS

| | | | |
|---|---|---|---|
| 3,124,096 | 3/1964 | Graig | 114/281 X |
| 3,682,495 | 8/1972 | Zaimi | 280/21 A X |
| 3,760,895 | 9/1973 | Martinmaas | 280/21 A X |
| 4,116,496 | 9/1978 | Scott | 305/12 |
| 4,165,087 | 8/1979 | Kagawa | 280/21 A X |

FOREIGN PATENT DOCUMENTS 1578848   7/1969   France .................................. 280/21 A Primary Examiner—Joseph F. Peters, Jr.
Assistant Examiner—Michael Mar
Attorney, Agent, or Firm—Lane, Aitken, Ziems, Kice & Kananen

[57] ABSTRACT

A ski edging device for a snowmobile includes an articulable joint connected between the snowmobile body and the skis to permit rotation of the skis relative to the body about a steering axis and to permit rotation of the skis relative to the body about a camber axis to control the angle of the inclination of the skis during turning maneuvers to prevent lateral side slipping of the snowmobile. A first control arm is secured to a portion of the articulable joint to move with rotation of the skis about the steering axis and a second control arm is secured to a second portion of the articulable joint to move with rotation of the skis about the camber axis. A cable and pulley system is connected between the first and second control arms such that a turning movement of the skis about the steering axis causes the first control arm to vary the position of the second control arm to rotate the skis about the camber axis to provide the desired edging effect. The device provides for a change in the angle of inclination of the skis relative to the snowmobile body in proportion to the turning radius of the skis to provide an edging effect that limits lateral side slippage to permit higher safe-turning speeds.

7 Claims, 6 Drawing Figures

FIG. 1
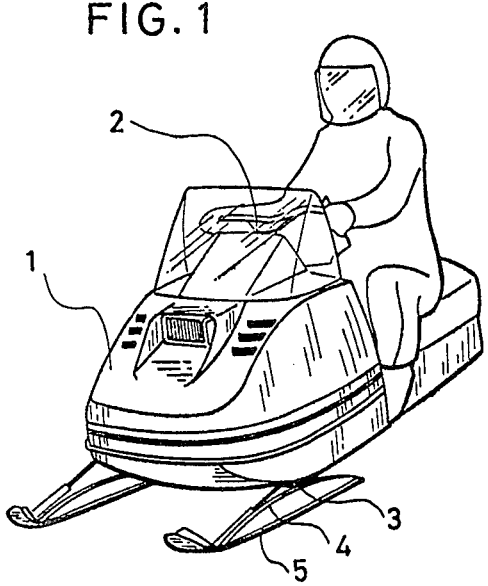
FIG. 2(a)
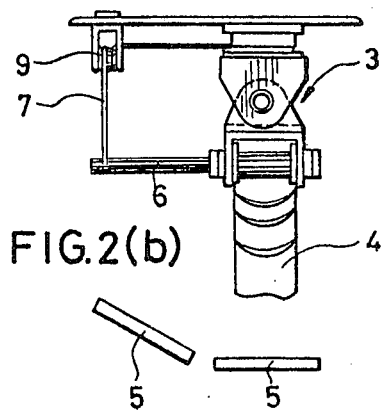
FIG. 2(b)
FIG. 3
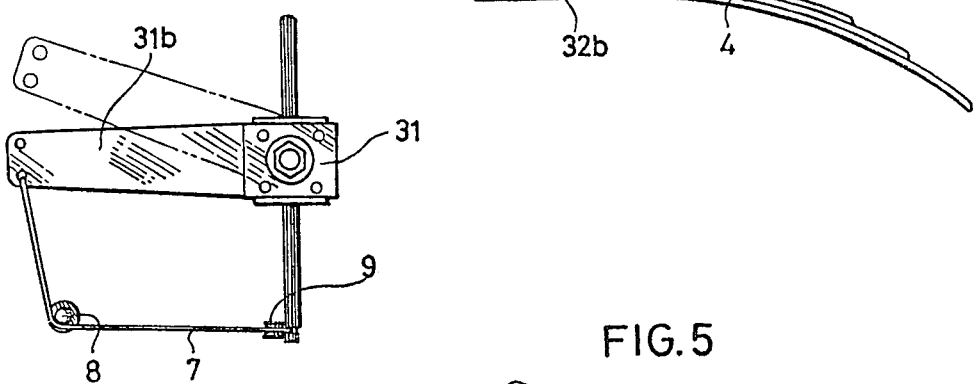
FIG. 4
FIG. 5
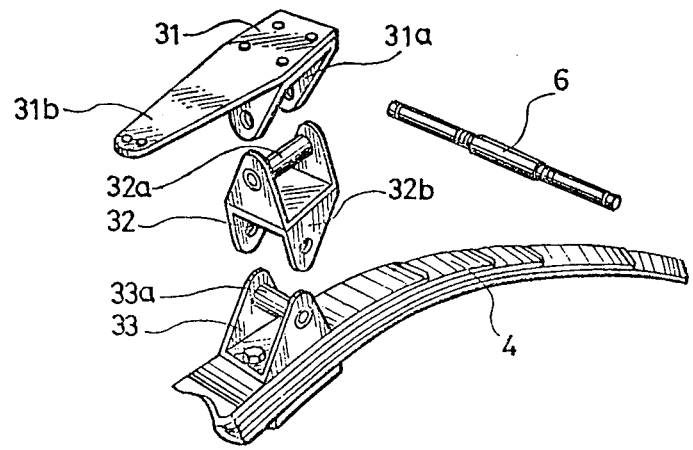

SKI EDGING DEVICE FOR A SKI SUPPORTED VEHICLE OR THE LIKE

BACKGROUND OF THE INVENTION

The present invention relates to a mechanism for controlling the skis of a ski supported vehicle and, more particularly, to a ski edging device for controlling the camber or angle of inclination of the skis during the turning maneuvers of a snowmobile or the like to provide an edging effect that limits lateral side slipping.

Snowmobiles typically include front skis or runners that can be turned about a generally vertical steering axis in response to a steering command to control the direction of travel of the snowmobile. During high speed turning operations, the snowmobile can undergo lateral or slide slippage in response to centrifugal forces acting on the vehicle body. This aspect of snowmobile operation is inherent in ski supported vehicles and can cause unstable high-speed turning and limit the maximum safe turning-speed of the snowmobile.

SUMMARY OF THE INVENTION

In view of this, it is an object of the present invention, among others, to provide a device that effects edging of the skis of a ski-supported vehicle such as a snowmobile in response to a turning movement of the vehicle.

It is another object of the present invention to provide a ski-edging device for a ski-supported vehicle that varies the camber angle of the ski relative to the vehicle body during turning movements to limit lateral side slippage.

It is a further object of the present invention to provide a ski-edging device for a snowmobile which is responsive to steering commands in either direction and in which the change in camber angle of the ski is proportional to the steering command.

In accordance with the present invention, a ski-supported snowmobile is provided with an articulable joint connecting the snowmobile body to the skis with the joint rotatable about a steering axis to permit vehicle turning in response to a vehicle steering control and rotatable about a chamber axis to varying the angle of inclination of the ski relative to the vehicle body. A first control arm is connected to a first portion of the articulable joint for movement with the ski about the steering axis and a second control arm is connected to another portion of the articulable joint for movement with the ski about the camber axis. A flexible band and pulley means is connected between the ends of the first and second control arms such that movement of the first control arm about the steering axis causes the flexible band, acting through the pulleys and the second control arm, to proportionally rotate the ski about the camber axis to provide the desired edging effect.

In the preferred embodiment, the articulable joint is formed as a universal-type joint having an upper yoke rotatably connected to the vehicle body and a lower yoke secured to the ski through a spring. An intermediate link or spider connects the upper and lower yokes to permit articulation of the ski about the camber axis to vary the angle of inclination of the ski relative to the body.

The present invention provides for ski-edging during turning maneuvers of the snowmobile to limit lateral side slippage and is particularly advantageous during high speed operation of snowmobiles or other ski-support vehicles such as sleds and sleighs.

BRIEF DESCRIPTION OF THE DRAWINGS

The above description, as well as the objects, features, and advantages of the present invention will be more fully appreciated by reference to the following detailed description of a presently preferred, but nonetheless illustrative, embodiment in accordance with the present invention, when taken in conjunction with the accompanying drawings wherein:

FIG. 1 is a perspective view of an exemplary snowmobile incorporating a ski edging device in accordance with the present invention;

FIG. 2a is a partial, front elevational view of a ski-edging device showing the various parts in a neutral position and with selected parts broken-away or omitted for reasons of clarity;

FIG. 2b is a front sectional view of two skis showing a first ski in a neutral position and a second ski inclined at an angle to the first ski;

FIG. 3 is a partial, side elevational view of the ski-edging device with selected parts broken-away or omitted for reasons of clarity;

FIG. 4 is a partial, plan view of the ski-edging device showing a flexible band and pulley arrangement connected between two control arms; and FIG. 5 is an exploded perspective view of the ski-edging device shown in FIGS. 2a, 3 and 4.

DESCRIPTION OF THE PREFERRED EMBODIMENT

A ski edging device in accordance with the present invention is generally referred to in the figures by the reference character 3 and is shown in FIG. 1 mounted on an exemplary engine-powered snowmobile 1. The snowmobile 1 is supported by a pair of spaced-apart runners or skis 5 with each ski connected to the snowmobile body by a multi-leaf, semi-elliptical spring 4 connected to the ski and the ski edging device 3 connected between the spring 4 and the underside of the snowmobile body.

A manually operable steering control 2 is provided on the snowmobile 1 and is connected to the skis 5 through a steering mechanism (not shown) to permit controlled rotation of the skis 5 about a generally vertical steering axis in response to a steering command from the steering control 2 to control the direction of movement of the snowmobile 1.

As shown in FIGS. 3, 4, and 5, the edging device 3 includes an articulable joint assembly fabricated from a control member 31, a lower yoke 33, and an intermediate link or spider 32 connected between the control member 31 and the lower yoke 33.

The control member 31 is fabricated from an upper yoke 31a that is secured, as by welding, to one end of a control arm 31b. The upper yoke 31a includes two spaced-apart, downwardly extending flanges with coaxial mounting holes formed through the flanges.

The lower yoke 33 is secured, e.g., by threaded fasteners, to the spring 4 and includes two spaced-apart, upwardly extending flanges that are formed at a generally right angle to the flanges of the upper yoke 31a as shown in FIG. 5. The flanges of the lower yoke 33 are formed with coaxial holes with a hollow bushing inserted between the flanges in registration with the holes.

The intermediate spider 32 connects the control member 31 with the lower yoke 33 for universal joint-type articulation therebetween. The intermediate spider 32 includes two spaced-apart, upwardly extending flanges 32a with coaxial openings formed in the flanges and a bushing inserted between the flanges in registration with the openings. The spider 32 also includes two spaced-apart, downwardly extending flanges 32b that are formed at a generally right angle to the upwardly extending flanges 32a with coaxial mounting holes formed through the flanges 32b.

The upwardly extending flanges 32a of the spider 32 are designed to fit between the downwardly extending flanges of the upper yoke 31a and be connected thereto by a suitable threaded fastener which extends through the various openings in the flanges to permit the upper yoke and the spider to articulate relative to one another about a generally longitudinally extending camber axis to vary the angle of inclination of the skis 5 relative to the snowmobile body.

The lower yoke 33a is designed to fit between the downwardly extending flanges 32b of the spider 32 and to be connected thereto by an elongated control pin 6 that extends through the various openings in the flanges to permit articulation between the lower yoke 33a and the spider 32 about a generally lateral axis. As shown in the plan view of FIG. 4, the control pin 6 extends outwardly from both sides of the lower yoke 33.

With the skis 5 connected to the snowmobile 1 body through their respective edging devices 3, each ski 5 is adapted to rotate relative to the snowmobile body about a generally vertical steering axis in response to a steering command from the steering control 2, about a generally longitudinal axis defined by the yoke 31a to permit variation in the camber angle of the ski, and about a generally lateral axis defined by the lower yoke 33 to permit the skis 5 to rock relative to the snowmobile body during forward motion of the snowmobile.

The distal end of the control arm 31b of the control member 31 is connected to the distal end of the control pin 6 through a cable and pulley arrangement that includes a pulley 8 rotatably mounted on the snowmobile body and spaced from the side of the control arm 31b and a pulley 9 rotatably mounted on the body above the pin 6. A flexible but inextensible band 7, such as wire rope or cable, is connected at one end through an attachment hole to the distal end of the control arm 31b with the other end thereof connected to a peripheral recess formed in the distal end of the control pin 6. The intermediate portion of the cable 7 is entrained about the pulleys 8 and 9. While the cable and pulley arrangement is shown connected to only one side of the control arm 31b and the pin 6 in FIG. 4, it is to be understood that an identical cable and pulley arrangement is provided for the other side thereof.

The edging device 3 is connected to the ski 5 so that a steering command from the steering member 2 causes the control member 31 to rotate about the steering axis with the ski 5 caused to rotate about its camber axis to provide the desired edging effect. As shown in FIG. 4, for example, when the control member 31 is rotated in a clockwise direction about the steering axis, the control arm 31b is displaced from its neutral, solid-line position to its broken-line position. This movement of the control arm 31b causes the cable 7 to translate relative to the pulleys 8 and 9 to displace the end of the control pin 6 and then cause the ski 5 to rotate or tilt about its camber axis and thereby provide the desired edging effect. In FIG. 2a, the control pin 6 is shown in a generally horizontal, neutral position with the corresponding ski 5 shown in FIG. 2b in a neutral position (that is, substantially parallel to the lateral axis of the snowmobile 1). When the control pin 6 is displaced by the movement of the control arm 31b and the cable 7, the ski 5 is caused to tilt about the camber axis and incline relative to the lateral axis of the snowmobile 1 as illustrated by the inclined ski 5 on the left side of FIG. 2b.

By providing cable and pulley arrangements on each side of the control arm and connected to the opposite distal ends of the control pin 6, the change in the camber angle of the ski and the desired edging effect can be effected for both right and left hand turning maneuvers of the snowmobile.

As can be appreciated, the proportional ratio of the change in the camber angle for the skis 5 relative to the steering movement from the steering member 2 can be varied by varying the respective lengths of the control arm 31b and the portions of the control pin 6 that extend outwardly from the lower yoke 33.

The ski edging device 3 in accordance with the present invention advantageously alters the camber or angle of inclination of the skis 5 relative to the snowmobile 1 body to prevent or at least minimize lateral or side slippage of the snowmobile during turning maneuvers and provide for a higher maximum-safe turning speed.

As will be apparent to those skilled in the art, various changes and modifications may be made to the ski edging device of the present invention without departing from the spirit and scope of the invention as recited in the claims and their legal equivalent.

What is claimed is:

1. A ski edging device for a snowmobile or other ski supported vehicle of the type having a body supported by steerable skis and a movable steering means connected to the skis for turning the skis about each respective ski-steering axes to control the direction of travel of the vehicle, said device comprising:

an articulable joint connected between each ski and the body of the vehicle, said joint rotatable about a respective ski-steering axis with said ski in response to a steering movement from a steering means, said articulable joint having a first portion articulable relative to a second portion to permit rotation of said ski about a camber axis;

a first control arm means coupled to said first portion and rotatable with said first portion about said ski-steering axis;

a second control arm means coupled to said second portion and rotatable with said second portion about said camber axis, said second control arm means including a portion that extends laterally outward from one side of said ski and another portion that extends laterally outward from the other side of said ski;

first flexible band and pulley means connected between said first control arm means and said first-mentioned portion of said second control arm means extending laterally outward from one side of said ski; and second flexible band and pulley means connected between said first control arm means and said second-mentioned portion of said second control arm means extending laterally outward from the other side of said ski;

whereby rotation of said first control arm means about said ski-steering axis in a first direction in response to a steering movement in a first direction from said steering means causes said first flexible band and pulley means to rotate said ski about said camber axis in a first direction, and rotation of said first control arm means about said ski-steering axis in a second direction in response to a steering movement in a second direction from said steering means causes said second flexible band and pulley means to rotate said ski about said camber axis in a second direction, opposite from said first direction.

2. The ski edging device claimed in claim 1 wherein said articulable joint comprises:
   a first yoke coupled to said body and rotatable about said ski steering axis;
   a second yoke coupled to said ski; and
   an intermediate link pivotably connected to said first and said second yokes to permit relative rotation of said ski about the camber axis.

3. The ski edging device claimed in claim 2 wherein said first yoke includes downwardly extending spaced-apart flanges,
   said second yoke includes upwardly extending spaced-apart flanges oriented at a generally right angle to the flanges of said first yoke;
   said intermediate link including upwardly extending flanges pivotably connected to the flanges of said first yoke and downwardly extending flanges pivotably connected to the flanges of said second yoke to permit articulation of said ski about said camber axis.

4. The ski edging device claimed in claim 2 or claim 3 wherein
   said first control arm means is connected to said first yoke for rotation therewith about said ski-steering axis, and
   said second control arm means is connected to said second yoke for rotation with said second yoke about said camber axis.

5. The ski edging device claimed in claim 4 wherein said second control arm means is an elongated rod extending laterally outward from opposite sides of said ski, the first and second flexible band and pulley means connected, respectively, to opposite distal ends of said elongated rod.

6. The ski edging device claimed in claim 5 wherein the laterally outward extending portions of said elongated rod are of equal length.

7. A ski edging device for a ski supported vehicle of the type having a body supported by steerable skis and a steerable steering means connected to the skis for turning the skis about respective ski-steering axes to control the direction of travel of the vehicle, the skis connected through an articulable joint that permits at least rotation of said skis about a respective camber axis to affect edging, said edging device comprising:
   first control arm means connected to said vehicle steering means for movement in response to rotation of said steering means;
   second control arm means connected to said ski, said second control arm means, when pulled in a first direction causing rotation of said ski in a first direction about its camber axis and, when pulled in a second direction, causing rotation of said ski in a second direction about its camber axis;
   first and second flexible band and pulley means connected between said first and second control arm means, said first flexible band and pulley means responsive to rotation of said steering means in a first direction to pull said second control arm means in a first direction to cause said ski to rotate about its camber axis in a first direction, and said second flexible band and pulley means responsive to rotation of said steering means in a second direction to pull said second control arm means in a second direction to cause rotation of said ski about said camber axis in a second direction thereof.

* * * * *